T. A. B. PUTNAM.
ELECTRO-MAGNETIC RAILROAD-SIGNALS.

No. 182,384.

2 Sheets—Sheet 1.

Patented Sept. 19, 1876.

Witnesses:
A. B. Woodhead
J. Y. Woodhead,

Inventor:
Theodore A. B. Putnam

T. A. B. PUTNAM.
ELECTRO-MAGNETIC RAILROAD-SIGNALS.
No. 182,384. Patented Sept. 19, 1876.
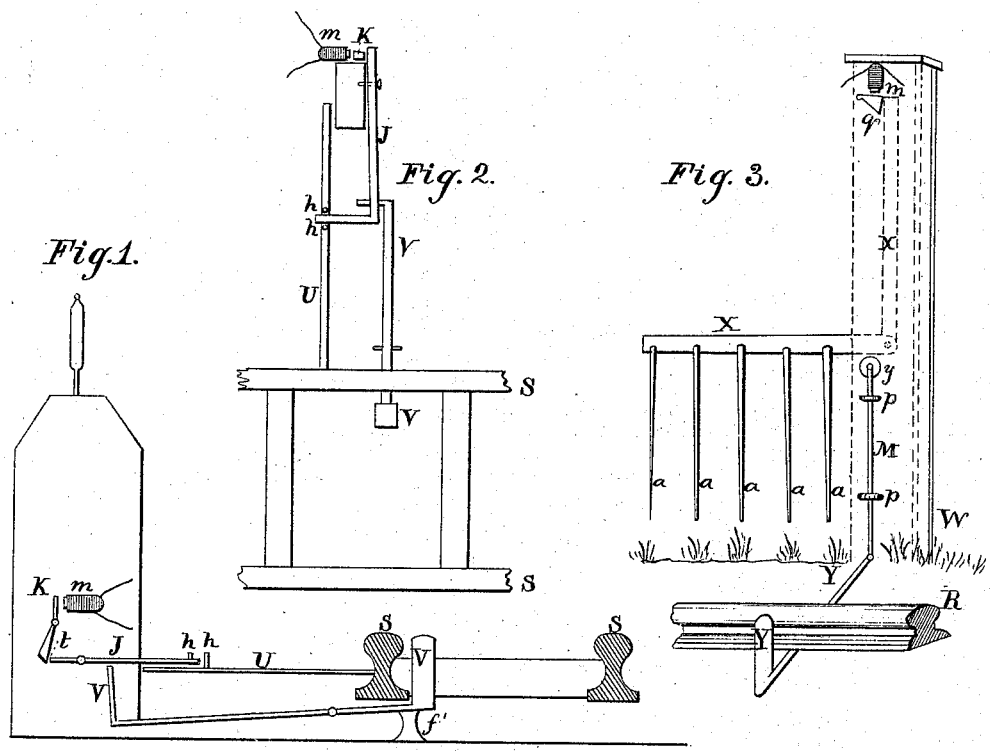
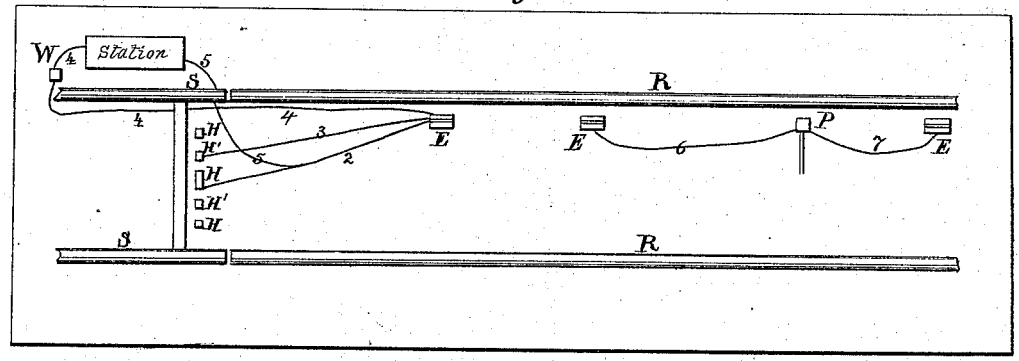
Witnesses:
A. B. Woodhead.
J. W. Woodhead.
Inventor:
Theodore A. B. Putnam.

UNITED STATES PATENT OFFICE.

THEODORE A. B. PUTNAM, OF NEW YORK, N. Y.

IMPROVEMENT IN ELECTRO-MAGNETIC RAILROAD-SIGNALS.

Specification forming part of Letters Patent No. 182,384, dated September 19, 1876; application filed July 31, 1875.

*To all whom it may concern:*

Be it known that I, THEODORE A. B. PUTNAM, of New York, N. Y., have invented a system of Electrical Railway Signaling, of which the following is a specification:

The nature of my invention consists of a system of electrical railway signaling, described hereafter, by which a locomotive, at different times, forms a part of several electric circuits for the following purposes: First, to denote when a switch or draw-bridge is displaced, by operating an audible or visible alarm placed on a locomotive; second, from a locomotive to lock a switch or draw-bridge when in safety position; third, to signal one locomotive by another locomotive on the same line; fourth, to signal at road-crossings and depots by a locomotive; fifth, to signal a locomotive from a depot by operating an audible or visible alarm placed on a locomotive—all the above signals to be transmitted by conducting-wires through such a distance between a locomotive and the cause for signaling as may be desirable.

In ordinary practice, and in here describing, I use one battery, and place it on the locomotive, but I claim the privilege to place it at any point within the electric circuit, and to use one or more batteries.

Placed suitably in the cab of the locomotive, and within the circuit of the battery, is the audible or visible signal to be operated. I prefer a steam-whistle that, released by a magnet from a catch, will sound until closed by hand.

I use in these specifications and claims the word "locomotive," as including and signifying its tender and attached train.

In the following description, reference is made to the drawings by letters, similar letters indicating similar parts in all the drawings.

Figure 1:
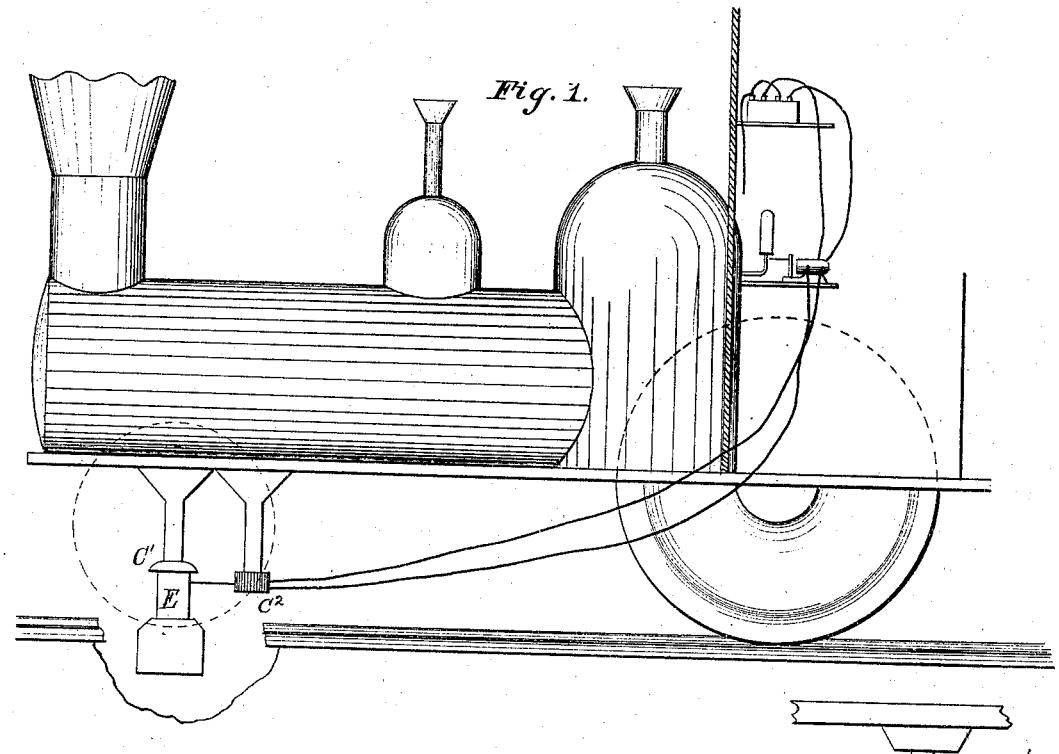
Figure 2:
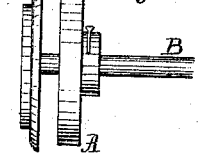

The plates are marked I and II, and the drawings, Fig. 1, Fig. 2, &c.

Figure 3:
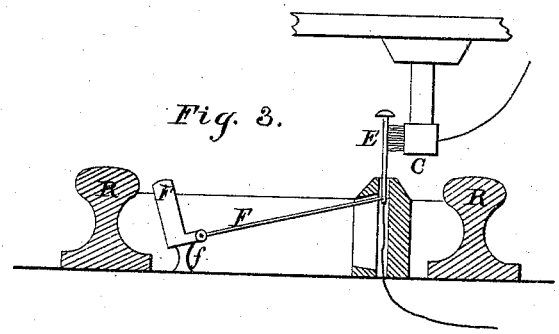
Figure 4:
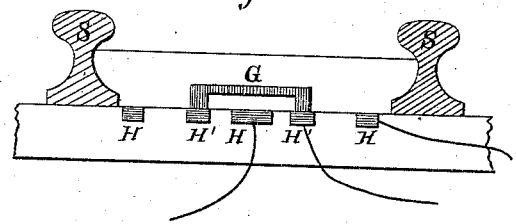
Figure 5:
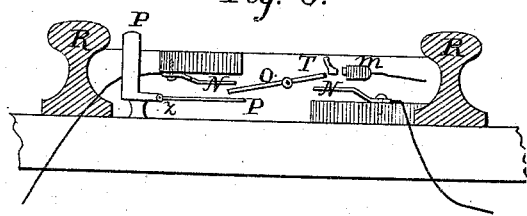

Plate I.—Figure 1 shows the mode of the locomotive forming a circuit; Fig. 2, the wheel attached to the axle; Fig. 3, the form of brush, and a vertical sectional view of the formation to conduct the electricity from it; Fig. 4, a vertical sectional view under the switch-rail; Fig. 5, a vertical sectional view of the mechanism for block-signals.

Plate II.—Figure 1 is a side vertical view of mechanism for locking a switch. Fig. 2 is a plan view of Fig. 1. Fig. 3 is a vertical sectional view of mechanism to signal road-crossings. Fig. 4 is a general plan of the wires and connections necessary for the system of signals.

*Mechanical construction*—First. The wheel A is made of any required width and diameter, in two parts, and fastened in a suitable manner around the axle B of the locomotive, and revolving with it, 'C 'C representing the flanged moving wheel.

Second. The metal brush C is composed of strands of fine wire, bound together in the form of a yielding brush. It is connected with the battery on the locomotive, and serves to convey the electricity to the conductor E placed between the rails R, and is so mounted beneath the locomotive as to press with frictional contact against the side of E while passing. I do not confine myself to this form of brush, nor limit the number in use, but use the word "brush" in the sense of one form of metal, passing another form of metal in frictional contact, for the purpose of conduction. In this description I use two brushes, and have, for reasons hereafter given, designated them as $C^1$ and $C^2$.

Third. The conductor E, suitably fastened between the rails R, is a plate or form of metal of suitable size, made with a right-angled covering-cap. E is inclosed in a box or frame, so as to allow it to rise and fall when acted on by the attached lever-arm F. The arm F, being depressed by wheel A, causes E to rise for contact with the brush C. When released from the pressure of A, E falls to the level of its frame, and is protected by its cap. When E is in contact with the brush C, the wires attached to E, 2 3 4 5 6 7, form circuits required for the several purposes before named. E may be formed of one piece only, or of two pieces joined and insulated, so that each piece shall form a separate electric circuit. Under the arm F is placed a rubber spring, $f$. The formation E is designed for use in latitudes where an accumulation of frozen snow might break the electric current from C to an uncovered conductor; but it is designed to substitute a simple bar for E, where no snow interferes, for the purpose of conduction.

Fourth. For closing and breaking a circuit, by moving the switch-rail S to signal when displaced, and to lock when not displaced, I use the following devices: Attached under and moving with the switch-rail S is the metal conductor G, its movement bringing it in contact with either the two metal conductors H H or H' H', with their attached separate conducting-wire 2 and 3, to form the separate circuits required. When G is in contact with H H and wire 2, a circuit is formed to signal the locomotive. When G is in contact with H' H' and wire 3, a circuit is formed to lock the switch.

Locking the switch is effected by the unequally-pivoted lever-arm J, attached to the switch-standard, and turned to a right angle at one end, being held at the other end when not locking by the gravity swinging drop K. The magnet m, controlled by wire 3, is placed to attract the drop K, and thus release J and cause it to fall into a socket, h, in the switch-rod U, thus preventing any movement of the switch.

To unlock the switch, a double right-angled unequally-pivoted lever, V, is placed to receive the pressure of the wheel A from the locomotive, and to act on and raise the long end of the lever-arm J, thus releasing the socket h, the motion of J also permitting the drop K to swing over and hold lever J at the point e. Under V is placed a rubber spring, f. It is designed to inclose or box the above mechanism, to prevent tampering therewith, a visible signal being operated above the box by the movement of J, to indicate when the switch is locked. The same principle is designed to apply to a draw-bridge, which is only another form of switch, a change in detail only being required to fit it to a bridge.

Fifth. To signal one locomotive by another locomotive on the same line: Fastened in a suitable box between the rails R are the two metal conductors N N, attached at the ends to two blocks in such a manner as to have a free springing movement when subjected to pressure, and connected by wire 7 with the conductor E. Between N N is pivoted, unequally, the arm O, resting, when not in contact with N N, on the right-angled lever-arm P. Above O is hinged the swinging gravity-drop T, within attractive distance of the magnet m, controlled by wire 6. When the wheel A of the locomotive depresses the lever P, the arm O is brought into contact with the conductors N N, the gravity-drop T retaining O in such contact. When T is attracted by magnet m, the arm O is released from contact with N N, and rests on P. Beneath P is rubber spring z.

Sixth. To signal road-crossings and depots from a locomotive: At a road-crossing, at any distance from rails R, is planted a hollow upright, W, of metal or wood, made of any desirable height, and open on the two sides facing up and down the line. Within the open side of W is placed a light rod, X, held upright by the gravity-catch q. Placed to attract q is the magnet m, controlled by wire 4. The rod X at its lower end turns on an axle, so that X shall have, as intended, a free gravity movement when released by catch q, to a position at a right angle to W. A lever-arm, Y, is placed between rails R, to be acted on by the wheel A of the locomotive. To the other end of Y is pivoted a rod, M, confined by guides p, and having at its end a revolving wheel, y, the whole lever so placed that when X is horizontal it rests on y. When Y is depressed the rod M is raised, and the wheel y rolls X to its upright position within W. The same arrangement of all the parts is duplicated for double lines, the opposite open side of W being used. Attached along X it is designed to have strips a a, or pieces of any yielding material, colored for a danger-signal, or to have X unfold a signal in form and manner to a lady's fan when the two sides are at a right angle to each other; but I do not confine myself to a particular shape of signal. Signals to depots are made by continuing the wires to such depot, and operating a signal.

Seventh. To signal a locomotive from a depot: By tapping the wire of conduction that leads to conductors H H under switch-rail S, as shown by wire 5, tapping wire 2, a circuit can be formed at a depot to operate the alarm on the locomotive, independent of the displacement of the switch-rail S.

It is designed to have the wires of conduction insulated, and bound in the form of a cable, and spiked to the cross-ties, or to place them within iron pipes similarly fastened to the ties.

In the mechanical construction no provision has been made for return conductors to the battery, excepting the placing of ground-plates at proper points, on the supposition that the electricity will find a course of returning by the rails and locomotive. Failing to do so, a duplication of such wires and parts as will furnish return conduction will be necessary. All parts requiring insulation to be so constructed.

It must be comprehended, before describing operative action, that from the battery on the locomotive two positive wires proceed. In the circuit of one wire is the alarm in the cab to be operated. In the circuit of the other wire no alarm is placed.

It will be obvious that if only one positive wire was used, the alarm would sound in circuits when not required, and confusion would ensue. These two positive wires conduct each to a separate brush, C, which has contact with a separate conductor, E, or one insulated in its double form, as before described.

For clearness in the following operative action I have designated the brush in connection with the positive wire operating the alarm in the cab as $C^1$, and the brush in connection with the other positive wire as $C^2$.

*Operative Action.*—First. To signal a displaced switch to a locomotive: The wheel A acting on F, and raising E into contact with brush $C^1$, and G being in contact with H H, a circuit is formed from the battery to $C^1$, to E, by wire 2 to H, through G to H, operating the alarm in the cab placed in that circuit.

Second. To lock a switch from a locomotive: The wheel A acting on F, and raising E into contact with brush $C^2$, and G being in contact with H' H', a circuit is formed from the battery to $C^2$, to E, by wire 3 to H', through G to H', to the magnet m attracting K, and releasing J to drop into socket of switch-rod U. Unlocking is performed by the wheel A depressing V, and raising J out of socket h, in which position J is held by K swinging to gravity.

Third. To signal one locomotive by another on the same line: A locomotive, No. 1, having, while passing, by its wheel A, depressed P, and brought O into contact with N N, a locomotive, No. 2, following, and its wheel A raising E into contact with the brush $C^1$, a circuit is formed from the battery to $C^1$, to E, by wire 7 to N, through O to N, operating the alarm in the cab placed in that circuit. Should locomotive No. 1 have proceeded to, say, a mile, to another E before the locomotive No. 2 has reached the first E, and the wheel A of locomotive No. 1 raising E into contact with brush $C^2$, a circuit is formed from the battery to $C^2$, to E, by wire 6 to the magnet m, which, acting on drop T, releases O from contact with N N; therefore, when brush $C^1$ of locomotive No. 2 reaches and comes in contact with E, there being no circuit through O, no alarm is operated. Thus the locomotives are signaled when within a mile of one another, and not signaled when that distance is increased.

Fourth. To signal road-crossings and depots from a locomotive: The wheel A acting on F, and raising E into contact with brush $C^2$, a circuit is formed from the battery to $C^2$, to E, by wire H to magnet m, to attract the catch q and release the rod X. When the locomotive reaches the signal, the wheel A depresses the arm Y, and the rod M is raised, while wheel y rolls X to its position within upright W, held by catch q. Wire 4 continued to a depot will operate by the same circuit an alarm placed there.

Fifth. To signal a locomotive from a depot: The wheel A acting on F, and raising E into contact with brush $C^1$, a circuit is formed from the battery to $C^1$, to E, by wires 2 and 5, through an electric switch in the depot, operating the alarm on the locomotive placed in that circuit.

I claim—

1. The combination of the arm J, drop K, arm V, and socket h, with the necessary parts to operate the same, as herein shown and described, for the purposes intended.

2. A rising and falling conductor, E, constructed as described, in combination with the necessary parts to operate the same, and the mechanical combinations operating in connection with the movement of the same, as herein described and set forth.

3. The combination of the brush C with the conductor E, for the purposes intended.

4. The combination of the upright W, rod X, catch q, arms Y and M, and wheel y, with the necessary parts to operate the same, as herein shown and described, for the purposes intended.

5. The combination of the rod O, conductor N, drop T, and lever P, with the necessary parts to operate the same, as herein shown and described, for the purposes intended.

THEODORE A. B. PUTNAM.

Witnesses:
A. B. WOODHEAD,
J. F. WOODHEAD.